(12) United States Patent
Huang et al.

(10) Patent No.: US 10,849,201 B2
(45) Date of Patent: Nov. 24, 2020

(54) DRIVING CIRCUIT AND DRIVING METHOD FOR DRIVING LIGHT-EMITTING DIODE LOAD

(71) Applicant: Silergy Semiconductor Technology (Hangzhou) LTD, Hangzhou (CN)

(72) Inventors: Qiukai Huang, Hangzhou (CN); Jianxin Wang, Hangzhou (CN); Huiqiang Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/713,473

(22) Filed: Dec. 13, 2019

(65) Prior Publication Data

US 2020/0214108 A1     Jul. 2, 2020

(30) Foreign Application Priority Data

Dec. 26, 2018  (CN) .......................... 2018 1 1602750

(51) Int. Cl.
| | | |
|---|---|---|
| H05B 37/02 | (2006.01) | |
| H05B 45/3725 | (2020.01) | |
| H05B 45/10 | (2020.01) | |
| H02M 1/08 | (2006.01) | |
| H02M 1/00 | (2006.01) | |
| H05B 47/10 | (2020.01) | |
| H05B 47/16 | (2020.01) | |
| H05B 47/14 | (2020.01) | |
| H05B 45/30 | (2020.01) | |
| H05B 45/14 | (2020.01) | |

(52) U.S. Cl.
CPC .......... *H05B 45/3725* (2020.01); *H02M 1/08* (2013.01); *H05B 45/10* (2020.01); *H02M 2001/0054* (2013.01); *H05B 45/14* (2020.01); *H05B 45/30* (2020.01); *H05B 47/10* (2020.01); *H05B 47/14* (2020.01); *H05B 47/16* (2020.01)

(58) Field of Classification Search
CPC ........ H05B 45/30; H05B 45/14; H05B 47/10; H05B 47/14; H05B 47/16
See application file for complete search history.

(56) References Cited

U.S. PATENT DOCUMENTS

| | | |
|---|---|---|
| 6,005,780 A | 12/1999 | Hua |
| 6,580,258 B2 | 6/2003 | Wilcox et al. |
| 9,325,254 B2 | 4/2016 | Deng et al. |
| 9,331,588 B2 | 5/2016 | Chen |

(Continued)

*Primary Examiner* — Thuy Vinh Tran
(74) *Attorney, Agent, or Firm* — Michael C. Stephens, Jr.

(57) ABSTRACT

Driving an LED load using a driving circuit includes controlling a power transistor coupled in series with the LED load to operate in a linear mode when an input voltage varying periodically is higher than a driving voltage for the LED load; adjusting a transistor current flowing through the power transistor based on a difference between the input voltage and the driving voltage, without calculating an error between an average current flowing through the LED load and a desired current; and where the transistor current is controlled to be decreased when the difference between the input voltage and the driving voltage is relatively large, in order to reduce a conduction loss of the power transistor, and to cause the average current flowing through the LED load to meet a predetermined requirement of driving the LED load.

18 Claims, 8 Drawing Sheets

(56) References Cited

U.S. PATENT DOCUMENTS

| | | | |
|---|---|---|---|
| 9,488,680 | B2 | 11/2016 | Xu |
| 9,648,677 | B2 | 5/2017 | Wang et al. |
| 10,356,864 | B2* | 7/2019 | Chen ............... H05B 45/37 |
| 2009/0079355 | A1* | 3/2009 | Zhou ............... H05B 45/37 |
| | | | 315/246 |
| 2014/0078789 | A1 | 3/2014 | Li et al. |
| 2014/0111093 | A1* | 4/2014 | Sun ............... H05B 45/395 |
| | | | 315/127 |
| 2014/0239934 | A1 | 8/2014 | Zhang |
| 2015/0160270 | A1 | 6/2015 | Shi et al. |
| 2015/0280578 | A1 | 10/2015 | Huang et al. |
| 2018/0192485 | A1* | 7/2018 | Beij ............... H05B 45/395 |
| 2018/0376557 | A1* | 12/2018 | Beij ............... H05B 45/37 |

\* cited by examiner

DRIVING CIRCUIT AND DRIVING METHOD FOR DRIVING LIGHT-EMITTING DIODE LOAD

RELATED APPLICATIONS

This application claims the benefit of Chinese Patent Application No. 201811602750.0, filed on Dec. 26, 2018, which is incorporated herein by reference in its entirety.

FIELD OF THE INVENTION

The present invention generally relates to the field of power electronics, and more particularly to driving circuits and methods for driving a light-emitting diode (LED) load.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Light-emitting diodes (LEDs) are widely used as light sources due to high luminous efficiency, long life, and low power consumption. As a constant current load, an LED load may be driven by a drive module/circuit capable of outputting a constant current. Some LED driving approaches include a linear driving method and a switching driving method. In a switching driving method, a switching converter can control the constant current output to drive the LED load. Although good constant current control can be achieved by the driving method using the switching converter, the switching converter includes at least a main power transistor, a rectifier, and a magnetic element, such as an inductor or a transformer, which can result in high circuit cost and complicated control. In a linear driving method, a driving current flowing through the LED load may be controlled to be constant only by linear control for a power transistor.

Figure 1:
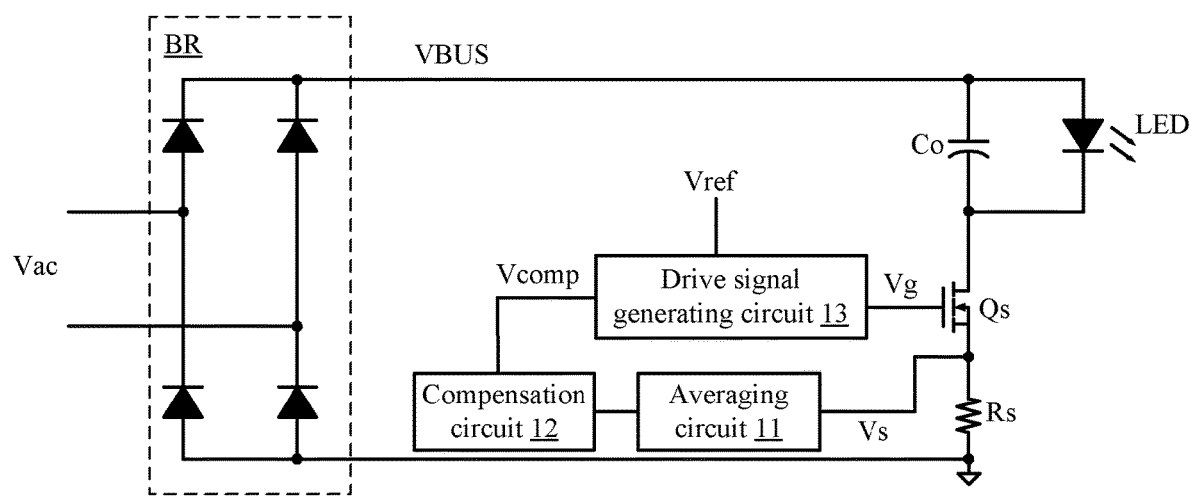
FIG. 1 is a functional block diagram of an example linear LED driving circuit.

Referring now to FIG. 1, shown is a functional block diagram of an example linear LED driving circuit. In an LED light source application scenario, the LED driving circuit can connect to an output end of rectifier bridge BR to receive direct current bus voltage VBUS. A filter capacitor can connect to the output end of rectifier bridge BR. The LED driving circuit can include sampling resistor Rs and power transistor Qs that are connected in series with the LED load, and output capacitor Co that is connected in parallel with the LED load, as well as a constant current control circuit.

In a linear driving method, no magnetic component (e.g., an inductor, transformer) may be needed, and only a power transistor may be needed, such that fewer elements are required overall, thereby greatly reducing circuit costs. However, in order to achieve constant current driving for the LED load, the control in the linear driving method is also relatively complicated, and the constant current control can be affected by factors, such as ripple, input voltage fluctuation, and dimmer performance. For example, in order to achieve constant current control, the constant current control circuit can include averaging circuit 11, compensation circuit 12, and drive signal generating circuit 13.

Sampling resistor Rs can sample a current flowing through the LED load. Averaging circuit 11 can convert a sampling signal across sampling resistor Rs into a current detection signal representing an average current flowing through the LED load. The average current may correspond to a brightness of the LED load. Compensation circuit 12 can calculate an error between the current detection signal and a reference current signal corresponding to a desired brightness of the LED load, and perform an error compensation operation to generate compensation signal Vcomp representing an error between a current average current and the desired current. Drive signal generating circuit 13 can generate a drive signal based on compensation signal Vcomp to drive a control terminal of power transistor Qs, in order to adjust the current flowing through the LED load.

When the current average current is less than the desired current, the drive signal may be increased by the closed-loop feedback control to increase the current flowing through the power transistor, such that the average current is increased and is maintained at the desired current. When the current average current is greater than the desired current, the drive signal may be decreased by the closed-loop feedback control to decrease the current flowing through the power transistor, such that the average current is decreased and is maintained at the desired current.

The constant current control circuit can adjust the drive signal based on the error between the current average current and the desired current to change the real-time current. The average current may be maintained at the desired current by the closed-loop adjustment, such that the LED load has the desired brightness. Further, in this approach, the real-time current flowing through the LED load may be provided by a power transistor and substantially fixed in a certain time period. That is, the real-time current can be substantially fixed in a time period in which the direct current bus voltage VBUS is higher than the voltage across the LED load. When the direct current bus voltage VBUS is much higher than the voltage across the LED load, the loss of the power transistor may be relatively large, which can greatly reduce the operating efficiency of the LED driving circuit.

In one embodiment, a method of driving an LED load can include: (i) controlling a power transistor coupled in series with the LED load to operate in a linear mode when an input voltage varying periodically is higher than a driving voltage for the LED load; (ii) adjusting a transistor current flowing through the power transistor based on a difference between the input voltage and the driving voltage, without calculating an error between an average current flowing through the LED load and a desired current; and (iii) where the transistor current is controlled to be decreased when the difference between the input voltage and the driving voltage is relatively large, in order to reduce a conduction loss of the power transistor, and to cause the average current flowing through the LED load to meet a predetermined requirement of driving the LED load.

In one embodiment, a driving circuit for an LED load can include: (i) a power transistor coupled in series with the LED load, and being configured to receive an input voltage that varies periodically; (ii) a control circuit configured to, when the input voltage is higher than a driving voltage for the LED load, control the power transistor to operate in a linear mode, and to control a transistor current flowing through the power transistor based on a difference between the input voltage and the driving voltage, without calculating an error between an average current flowing through the LED load and a desired current; and (iii) the control circuit being configured to, when the difference between the input voltage and the driving voltage is relatively large, control the transistor current to be decreased, to reduce a conduction loss of the power transistor, and cause the average current flowing through the LED load to meet a predetermined requirement of driving the LED load.

Figure 2A:
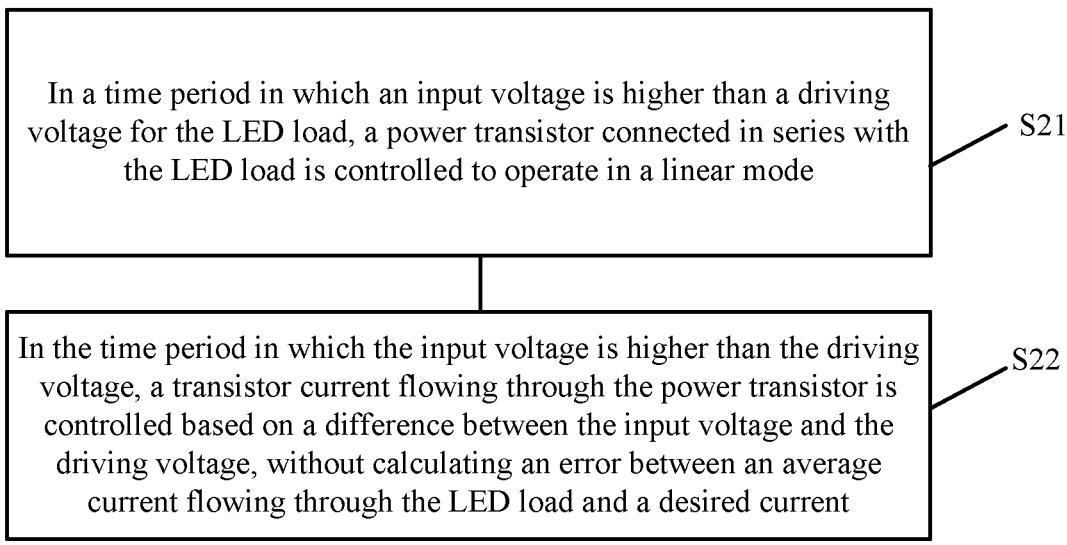
FIG. 2A is a flow diagram of a first example driving method for driving an LED load, in accordance with embodiments of the present invention.

Referring now to FIG. 2A, shown is a flow diagram of a first example driving method for driving an LED load, in accordance with embodiments of the present invention. In this particular example, the driving method for driving an LED load can include S21 and S22. In S21, in a time period in which an input voltage is higher than a driving voltage for the LED load, a power transistor connected in series with the LED load can be controlled to operate in a linear mode. The power transistor can connect in series with the LED load to form a current path, and may receive the input voltage varying periodically from an input end. For example, the input voltage may be a sinusoidal half-wave input voltage. An alternating current input voltage may be rectified by a rectifying circuit to form the sinusoidal half-wave input voltage.

In S22, in the time period in which the input voltage is higher than the driving voltage, a transistor current flowing through the power transistor can be controlled based on a difference between the input voltage and the driving voltage, without calculating an error between an average current flowing through the LED load and a desired current. When the difference between the input voltage and the driving voltage is relatively large, the current flowing through the power transistor can be decreased, in order to reduce a conduction loss of the power transistor, and cause the average current flowing through the LED load to meet a predetermined requirement for driving the LED load to emit a light having a desired brightness.

For example, the transistor current generated by the power transistor may be controlled based on a difference between the input voltage and the driving voltage, such that the transistor current in a time period in which the difference between the input voltage and the driving voltage is relatively large is less than the transistor current in a time period in which the difference between the input voltage and the driving voltage is relatively small. The transistor current can be decreased as the difference between the input voltage and the driving voltage increases, in order to reduce the conduction loss of the power transistor.

The difference between the input voltage and the driving voltage may be represented by a preset voltage threshold. Voltage thresholds with different values increasing sequentially may be set according to application requirements, and a threshold interval may be formed between two adjacent voltage thresholds. For each threshold interval, a reference current for the transistor current may be set correspondingly, in order to meet a requirement that the transistor current is decreased as the difference between the input voltage and the driving voltage increases. Based on a threshold interval in which the difference between the input voltage and the driving voltage is located, the transistor current can be controlled to be a reference current corresponding to the threshold interval. For example, during a half cycle in which the input voltage is in a rising phase, the transistor current can be controlled to be decreased stepwise. During a half cycle in which the input voltage is in a falling phase, the transistor current can be controlled to be symmetrical with the transistor current during the half cycle in which the input voltage is in the rising phase.

In particular embodiments, in the time period in which the input voltage is higher than the driving voltage, the real-time current flowing through the power transistor may have multiple different values depending on the difference between the input voltage and the driving voltage. In this way, the current flowing through the power transistor may be controlled to be small if the difference between the input voltage and the driving voltage is large, and the current flowing through the power transistor may be controlled to be large if the difference between the input voltage and the driving voltage is small, thereby reducing the conduction loss of the power transistor, while causing the average current flowing through the LED load to meet the requirement of driving the LED load to emit a light having a desired brightness.

Exemplary specific operational processes are described herein by taking a case that the real-time current flowing through the LED load includes a "first" current with a relatively large value, and a "second" current with a relatively small value. In a cycle, when the input voltage is higher than the driving voltage, the power transistor may be turned on. A magnitude of the difference between the input voltage and the driving voltage may be represented by a comparison between the difference and a preset voltage threshold. A length of a time period in which the current flowing through the power transistor is the first current can be controlled to not exceed a length of a time period in which the difference between the input voltage and the driving voltage is less than the preset voltage threshold. A length of a time period in which the current flowing through the power transistor is the second current can be controlled to not exceed a length of a time period in which the difference between the input voltage and the driving voltage is greater than the preset voltage threshold.

A voltage across the power transistor can approximately be equal to the difference between the input voltage and the driving voltage. When the voltage across the power transistor is relatively large, the current flowing through the power transistor may be the second current with a relatively small value, such that the conduction loss of the power transistor is greatly reduced. In addition, in the cycle, the current flowing through the power transistor may also be the first current with a relatively large value. Although the value of the first current is relatively large, the voltage across the power transistor in the time period in which the current flowing through the power transistor is the first current may be relatively small. In this case, the conduction loss may be relatively low. Further, the average current of the first current with a large value and the second current with a small value in one cycle can meet requirements of driving the LED load in order to emit a light having a desired brightness.

Figure 2B:
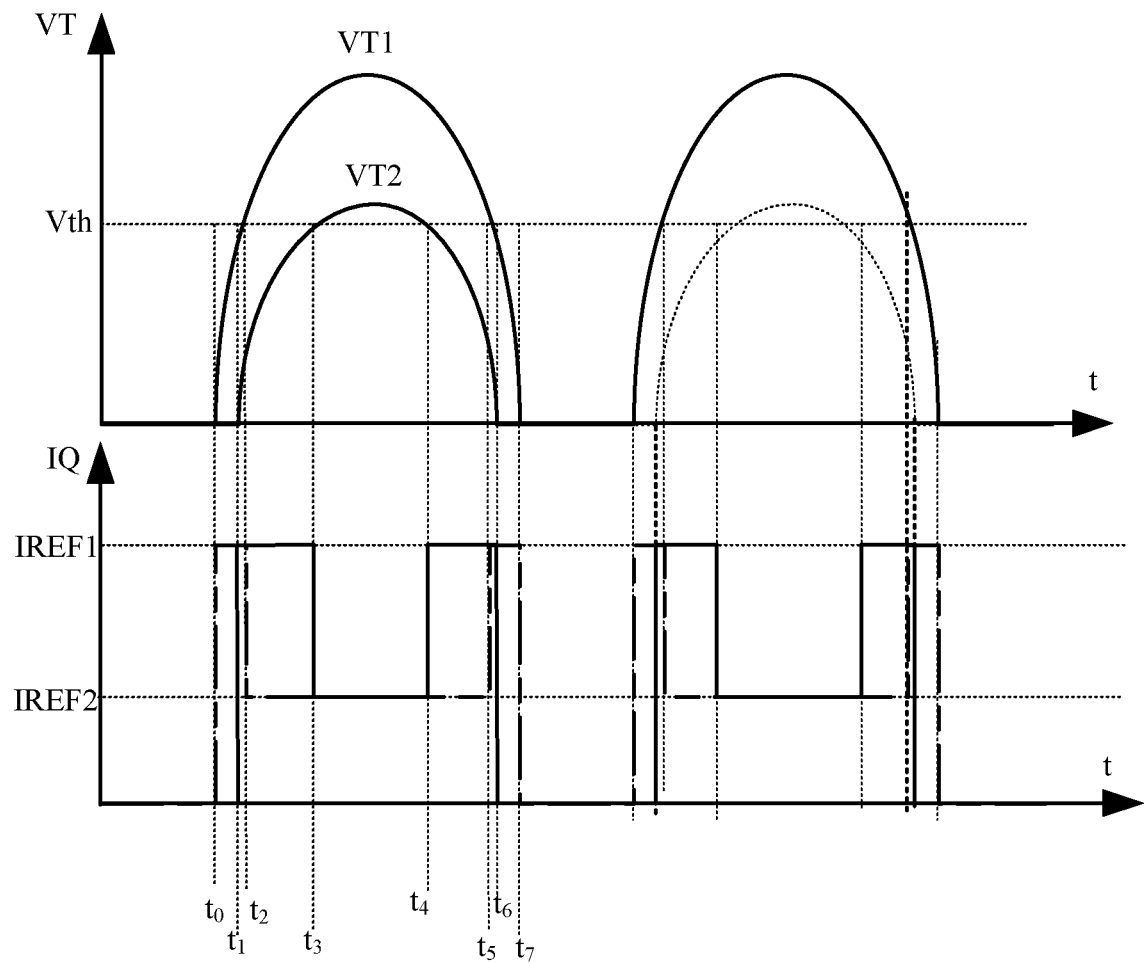
FIG. 2B is an operational waveform diagram of the first example driving method of FIG. 2A, in accordance with embodiments of the present invention.

Referring now to FIG. 2B, shown is an operational waveform diagram of the first example driving method of FIG. 2A, in accordance with embodiments of the present invention. In this example, VT represents the voltage across the power transistor, Vth represents the set voltage threshold, IQ represents the current flowing through the power transistor, IREF1 represents the first current with a relatively large value that is preset, and IREF2 represents the second current with a relatively small value that is preset. It can be understood that, the voltage across the power transistor may be approximately equal to the difference between input voltage VBUS and driving voltage VLED. When the LED load does not change, driving voltage VLED may be considered as a fixed value. In this case, after the power transistor is turned on (e.g., after input voltage VBUS is higher than driving voltage VLED), voltage VT may vary with input voltage VBUS.

Voltage threshold Vth can be set to be a fixed value. When input voltage VBUS is a first sinusoidal half-wave voltage having a small effective value, and when input voltage VBUS is higher than driving voltage VLED, voltage VT2 starts increasing from zero and varies with input voltage VBUS. In a time period from time instant t1 to time instant t3, voltage VT2 is lower than voltage threshold Vth, which indicates that the voltage across the power transistor is small, and current IQ in the time period from time instant t1 to time instant t3 may be current IREF1 with a large value, in order to prevent excessive conduction power loss. In a time period from time instant t3 to time instant t4, voltage VT2 is higher than voltage threshold Vth, which indicates that the voltage across the power transistor is large, and current IQ in the time period from time instant t3 to time instant t4 may be current IREF2 with a small value, in order to prevent excessive conduction power loss. Similarly, in a falling phase of voltage VT2, in a time period from time instant t4 to time instant t6, voltage VT2 is lower than voltage threshold Vth again, which indicates that the voltage across the power transistor is small, and current IQ may be current IREF1 with a large value.

When input voltage VBUS is a second sinusoidal half-wave voltage having a large effective value, the time instant when the input voltage VBUS is greater than driving voltage VLED precedes by that in the case that input voltage VBUS is the first sinusoidal half-wave voltage having a small effective value. Voltage VT1 may start increasing from zero at time instant t0 and can vary with input voltage VBUS. In a time period from time instant t0 to time instant t2, voltage VT1 is lower than voltage threshold Vth, which indicates that the voltage across the power transistor is small, and current IQ in the time period from time instant t0 to time instant t2 may be current IREF1 with a large value, in order to prevent excessive conduction power loss. In a time period from time instant t2 to time instant t5, voltage VT1 is higher than voltage threshold Vth, which indicates that the voltage across the power transistor is large, and current IQ in the time period from time instant t2 to time instant t5 may be current IREF2 with a small value, in order to prevent excessive conduction power loss. Similarly, in a falling phase of voltage VT1, in a time period from time instant t5 to time instant t7, voltage VT1 may be lower than voltage threshold Vth again, which indicates that the voltage across the power transistor is small, and current IQ in the time period from time instant t5 to time instant t7 may be current IREF1 with a large value.

It can be seen that, in the case that the effective value of input voltage VBUS is large, a duration during which current IQ is current IREF1 with a large value may be decreased, and a duration during which current IQ is current IREF2 with a small value may be increased, in order to reduce the conduction power loss of the power transistor. In addition, the average current flowing through the LED load corresponding to the brightness of the LED load can be an average current in a cycle. In the case that the effective value of the alternating current voltage corresponding to input voltage VBUS is small, an average current Iavg1 may be expressed by the following formula (1).

$$Iavg1 = [2*(t3-t1)*IREF1 + (t4-t3)*IREF2]/Ts \qquad (1)$$

In the case that the effective value of the alternating current voltage corresponding to input voltage VBUS is large, an average current Iavg2 may be expressed by the following formula (2).

$$Iavg2 = [2*(t2-t0)*IREF1 + (t5-t2)*IREF2]/Ts \qquad (2)$$

In formulas (1) and (2), Ts represents a power frequency cycle of the alternating current voltage, Iavg1 and Iavg2 respectively represent averages of the first and second currents in one power frequency cycle. It can be seen from the above formulas (1) and (2) that, duration (t3−t1) is greater than duration (t2−t0), and duration (t4−t3) is less than duration (t5−t2). Based on a variation range of input voltage VBUS, an appropriate voltage threshold Vth and a ratio of the first to the second current are set, such that the variation of the average current caused by the variation of input voltage VBUS may be limited in a small range (e.g., 5%). The small variation range can meet predetermined requirements of driving the LED load to emit a light having a desired brightness.

It should further be understood that, in different lighting environments, a light source may be implemented by different LED loads. For example, the number of LED strings may vary, such that the driving voltage for the LED load varies. In a case that input voltage VBUS does not vary, the difference between the input voltage and the driving voltage for the LED load (e.g., VT across the power transistor) may vary with driving voltage VLED. If the driving voltage increases, voltage VT can decrease. If the driving voltage decreases, voltage VT can increase. Durations of the first and second currents can vary accordingly. Similarly, as shown by formulas (1) and (2), the voltage threshold and the ratio of the first current to the second current may be set based on the input voltage and the variation range of the driving voltage, such that the error of the average current is still controlled in a small range (e.g., 5%), although the durations of the first and second currents may vary due to the variation of the driving voltage. The small variation range can meet predetermined requirements of driving the LED load to emit a light having a desired brightness.

Further, when both input voltage VBUS and driving voltage VLED vary in a certain range, similarly, as shown by the formulas (1) and (2), the voltage threshold and the ratio of the first current to the second current can be set based on the variation range of the input voltage and the variation range of the driving voltage, such that the errors of the average currents of the first current and the second current are controlled in a small range (e.g., 5%). The small variation range may meet predetermined requirements of driving the LED load to emit a light having a desired brightness.

As compared with a LED linear driving method by closed-loop feedback control, the power transistor may be controlled by open-loop control in a driving method for driving an LED load of particular embodiments. The current of the power transistor can be controlled based on the difference between the input voltage and the driving voltage, without calculating the error between the current average current of the LED load and the desired current by a closed-loop circuit. That is, the real-time current flowing through the LED load may be controlled to be not fixed but vary with the difference between the input voltage and the driving voltage, in order to reduce the conduction loss of the power transistor. Further, the durations of the currents of different values can be adjusted, such that the average current flowing through the LED load can meet requirements of driving the LED load to emit a light having a desired brightness, and a relatively good output current adjustment rate can be obtained when the input voltage varies.

In addition, the example driving method for driving an LED load can also include extending a time length used for the transistor current switching between different current values, in order to obtain a good electromagnetic compatibility (EMC) performance. In the current switching process, the transistor current can be increased or decreased from a current value to another current value in a ramp manner, rather than stepwise varying between two different current values.

Figure 3:
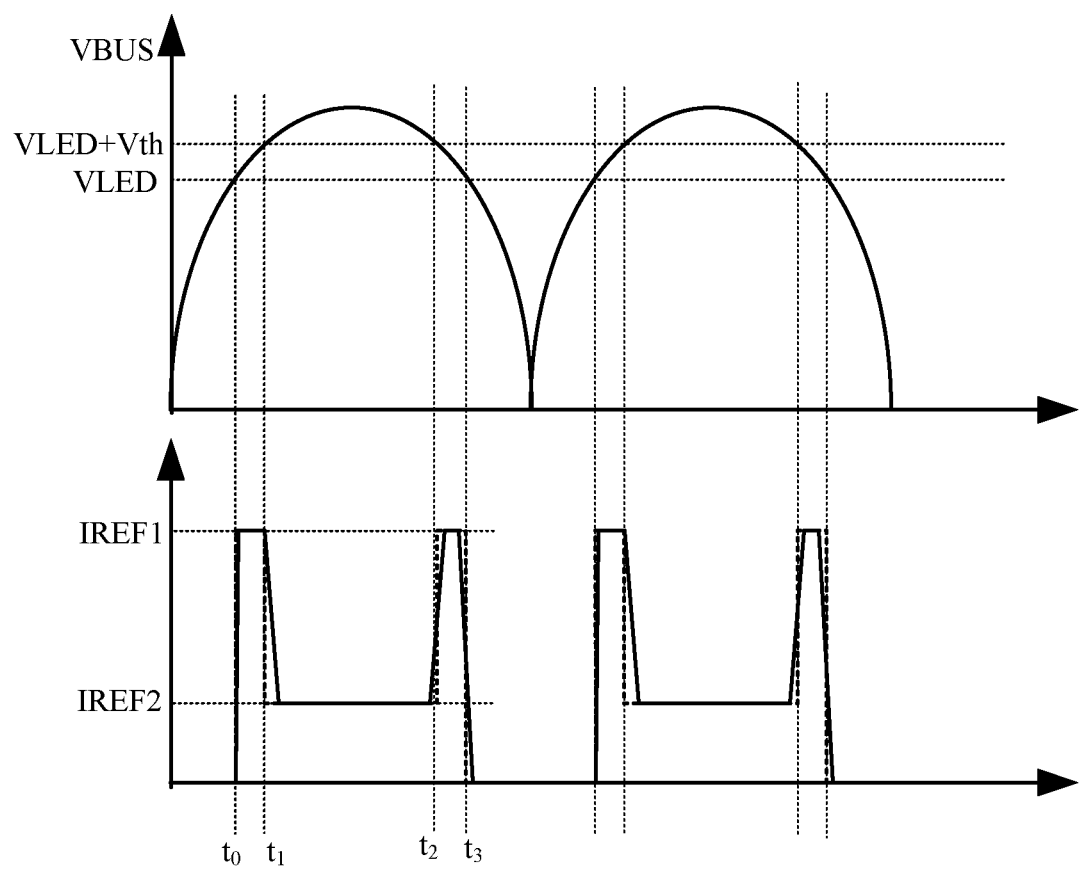
FIG. 3 is an operational waveform diagram of a second example driving method for driving an LED load, in accordance with embodiments of the present invention.

Referring now to FIG. 3, shown is an operational waveform diagram of a second example driving method for driving an LED load, in accordance with embodiments of the present invention. The real-time current flowing through the LED load can include a first current with a relatively large value and a second current with a relatively small value. At time instant t0, input voltage VBUS is higher than driving voltage VLED for the LED load, and the power transistor is turned on to allow a current to flow through the LED load. In a time period from time instant t0 to time instant t1, the difference between input voltage VBUS and driving voltage VLED is less than voltage threshold Vth, which indicates that the voltage across the power transistor is small, and current IQ in the time period from time instant t0 to time instant t1 may be current IREF1 with a large value, in order to prevent excessive conduction power loss. At time instant t1, the difference between input voltage VBUS and driving voltage VLED starts to be greater than voltage threshold Vth, and current IQ may switch to current IREF2 with a small value from current IREF1.

In this particular example, a time length used for current IQ switching from current IREF1 to current IREF2 can be extended, and current IQ can slowly be decreased to current IREF2 from current IREF1. For example, the current may be decreased to current IREF2 from current IREF1 at a certain decreasing slope. Similarly, at time instant t2, the difference between input voltage VBUS and driving voltage VLED starts to be less than voltage threshold Vth, and current IQ may switch to current IREF1 with a large value from current IREF2. For example, a time length used for the current IQ switching from current IREF2 to current IREF1 can be extended, and current IQ may slowly be increased to current IREF1 from current IREF2. For example, the current may be increased to current IREF1 from current IREF2 at a certain increasing slope. In this way, the current may vary slowly, and the EMC performance can be greatly improved.

In addition, at time instant t0, input voltage VBUS starts to be higher than driving voltage VLED, and current IQ starts to switch from zero (e.g., ground level) to current IREF1. The time length used for the current switching from zero to current IREF1 may be extended, and the current can slowly be increased to current IREF1 from zero. Similarly, at time instant t3, input voltage VBUS starts to be lower than the driving voltage VLED for the LED load, and current IQ starts to switch to zero from current IREF1. The time length used for the current switching from current IREF1 to zero may be extended, and the current can slowly be decreased to zero from current IREF1. In this way, EMC performance of the circuit can be further improved.

The driving method for driving an LED load can also include controlling the duration of the current with a large value, in order to better ensure the normal driving for the LED load without being affected by variation of the input voltage and other factors, such as a dimming angle. The controlling process may be performed by timing a duration during which the current flowing through the power transistor is the first current with a large value, and controlling the current flowing through the power transistor to switch from current IREF1 to current IREF2 with a small value when the duration during which the current flowing through the power transistor is current IREF1 reaches a first time threshold.

If a degree of decreasing in the input voltage is out of a preset range, or the LED driving system has a deep dimming depth in the case of having a dimming function, the duration during which the voltage across the power transistor is lower than the voltage threshold may be relative long. A maximum time length of the duration of the current with a large value can be limited with a driving method of particular embodiments, thus avoiding an excessively high average current that can interfere with driving the LED load to emit a light having a desired brightness.

Further, if the time length of the duration of the current with a large value is limited, a time length of the duration of the current with a small value may be limited. In this case, the example driving method can include controlling the current flowing through the power transistor to switch to current IREF2 from current IREF1 when a first duration during which the current flowing through the power transistor is current IREF1 reaches a first time threshold. The method can also include timing the duration during which the current flowing through the power transistor is current IREF2, and controlling the current flowing through the power transistor to switch to current IREF1 from current IREF2 when the time length of the duration during which the current flowing through the power transistor is current IREF2 reaches a second time threshold.

Figure 4:
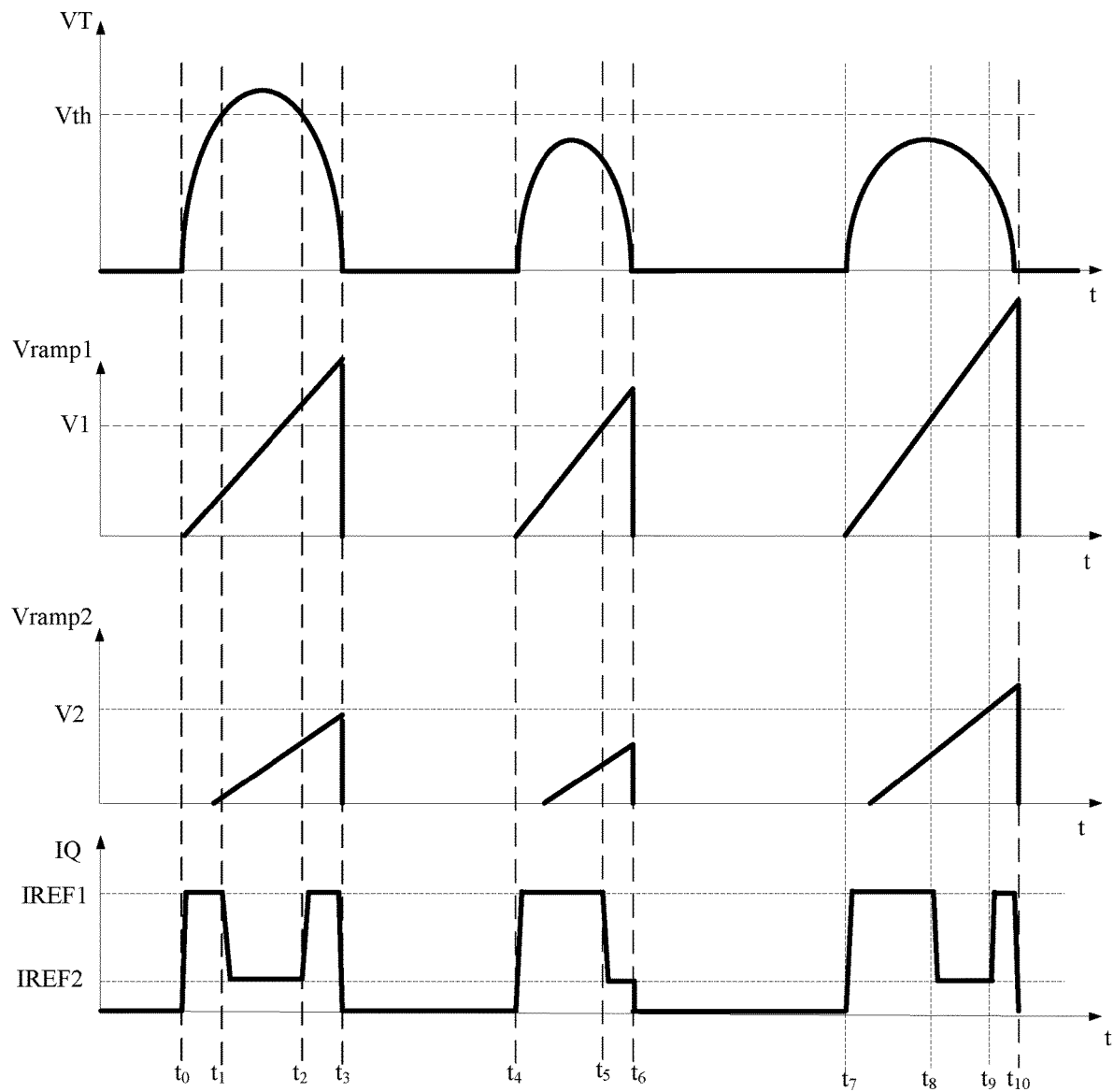
FIG. 4 is an operational waveform diagram of a third example driving method for driving an LED load, in accordance with embodiments of the present invention.

Referring now to FIG. 4, shown is an operational waveform diagram of a third example driving method for driving an LED load, in accordance with embodiments of the present invention. Here, the real-time current flowing through the LED load includes a first current (e.g., IREF1) with a relatively large value and a second current (e.g., IREF2) with a relatively small value as an example. In a time period from time instant t0 to time instant t3, a length of the durations [t0–t1] and [t2–t3] of current IREF1 may be less than a first time threshold, and a length of the duration at current IREF2 can be a length of a time period from time instant t1 to time instant t2 in which voltage VT is higher than voltage threshold Vth.

In a time period from time instant t4 to time instant t6, a length of the duration [t4–t5] of current IREF1 may be limited to a time length represented by the first time threshold. In a time period from time instant t5 to time instant t6, the transistor current can be maintained at current IREF2. In a time period from time instant t7 to time instant t10, a length of the duration [t7–t8] of current IREF1 may be limited to the time length represented by the first time threshold. After the time length represented by the first time threshold ends, the transistor current can be decreased to current IREF2 from current IREF1. A time length of the duration [t8–t9] of current IREF2 can be limited to a time length represented by the second time threshold. After the time length represented by the second time threshold ends, the transistor current can be increased to current IREF1 from current IREF2, and maintained at current IREF1 in a time period from time instant t9 to time instant t10.

The first and second time thresholds may be implemented in any suitable manner (e.g., by a timing circuit including a timer, an analog circuit, etc.). A capacitor can be charged by a constant current source, and a duration during which a ramp voltage across the capacitor is increased to a preset value may be timed. The duration at current IREF1 may be expressed as a duration during which ramp voltage Vramp1 is increased to time threshold V1 at an increasing slope, and the duration at current IREF2 may be expressed as a duration during which ramp voltage Vramp2 is increased to time threshold V2 at an increasing slope. As compared with the closed-loop control method, an open-loop control method for constant current control can be achieved in a simpler manner with the driving method for driving an LED load in particular embodiments.

Figure 5:
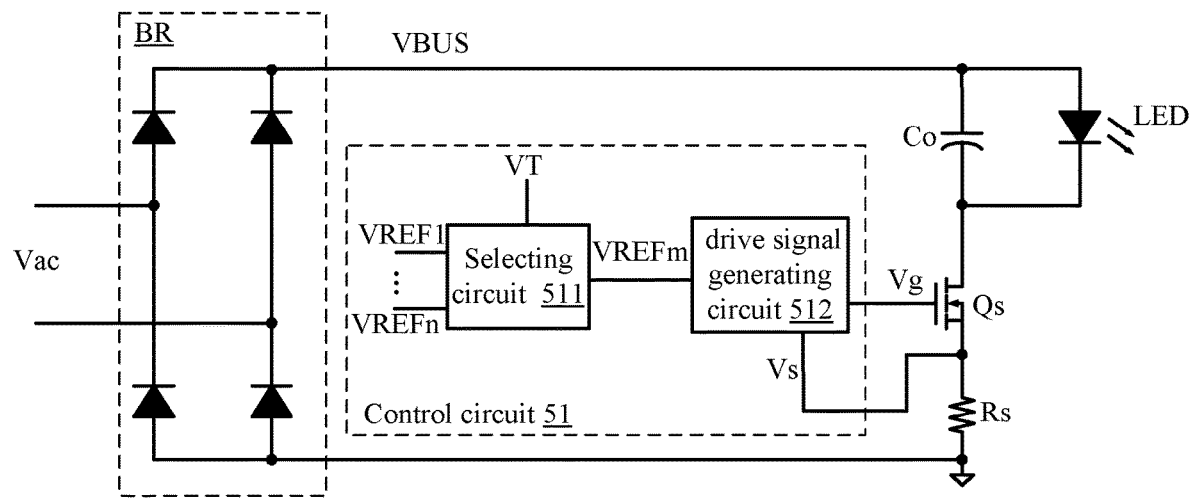
FIG. 5 is a schematic block diagram of a first example driving circuit for driving an LED load, in accordance with embodiments of the present invention.

Referring now to FIG. 5, shown is a schematic block diagram of a first example driving circuit for driving an LED load, in accordance with embodiments of the present invention. In this particular example, the driving circuit for driving an LED load can include power transistor Qs and control circuit 51. Power transistor Qs can connect in series with the LED load and may receive input voltage VBUS varying periodically. The input voltage VBUS may be generated by rectifying alternating current voltage Vac by rectifying circuit BR, and can have a sinusoidal half-wave waveform. In a dimming application scenario, input voltage VBUS is a phase-cutting sinusoidal half-wave direct current voltage. For example, a dimmer chops a portion of each waveform of alternating current voltage Vac to pass the remainder of the waveform to rectifying circuit BR, which provides the phase-cutting sinusoidal half-wave direct current voltage.

Control circuit 51 can control power transistor Qs to operate in a linear mode when input voltage VBUS is higher than driving voltage VLED for the LED load. Control circuit 51 may operate in an open-loop control mode, and can control a current (e.g., a transistor current) flowing through the power transistor based on a difference between input voltage VBUS and driving voltage VLED, without calculating an error between an average current flowing through the LED load and a desired current. When the difference between input voltage VBUS and driving voltage VLED is relatively large, control circuit 51 can control the current flowing through the power transistor to be relatively small, in order to reduce a conduction loss of the power transistor, and cause the average current flowing through the LED load to meet a predetermined requirement of driving the LED load to emit a light having a desired brightness.

In a time period in which input voltage VBUS is higher than driving voltage VLED for the LED load, the real-time current flowing through the power transistor may have multiple different values depending on the difference between input voltage VBUS and driving voltage VLED. In this way, the current flowing through the power transistor may be controlled to be relatively small if the difference between input voltage VBUS and the driving voltage VLED is relatively large. Also, the current flowing through the power transistor may be controlled to be relatively large if the difference between input voltage VBUS and driving voltage VLED is relatively small. This can reduce the conduction loss of the power transistor, while causing the average current flowing through the LED load to meet requirements of driving the LED load to emit a light having a desired brightness.

For example, control circuit 51 can include selecting circuit 511 and drive signal generating circuit 512. Selecting circuit 511 can receive a set of reference signals VREF1 to VREFn representing expected values of the transistor current and voltage detection signal VT representing a difference between input voltage VBUS and driving voltage VLED, where n is an integer greater than 1. Selecting circuit 511 can also select, based on voltage detection signal VT, reference signal VREFm from reference signals VREF1 to VREFn.

Drive signal generating circuit 512 can receive selected reference signal VREFm and detection signal Vs representing the transistor current, where detection signal Vs represents a value of a real-time current flowing through power transistor Qs. Drive signal generating circuit 512 can generate drive signal Vg based on a difference between reference signal VREFm and detection signal Vs, in order to drive a control terminal of power transistor Qs to control power transistor Qs to operate in the linear mode and control the real-time current flowing through power transistor Qs to correspond to reference signal VREFm. Detection resistor Rs connected in series with power transistor Qs may be provided, and when power transistor Qs is turned on, a voltage across detection resistor Rs can function as detection signal Vs.

As compared with the LED linear driving method by closed-loop feedback control, the power transistor can be controlled by the open-loop control in the driving circuit for driving an LED load in particular embodiments. The current of the power transistor can be controlled based on the difference between the input voltage and the driving voltage, without calculating the error between the current average current of the LED load and the desired current by a closed-loop circuit. That is, the real-time current flowing through the LED load may be controlled to be not fixed but vary with the difference between the input voltage and the driving voltage, in order to reduce the conduction loss of the power transistor. Further, the durations of the currents of different values can be adjusted, such that the average current flowing through the LED load can meet a requirement of driving the LED load to emit a light having a desired brightness, as well as a good output current adjustment rate being obtained.

Figure 6:
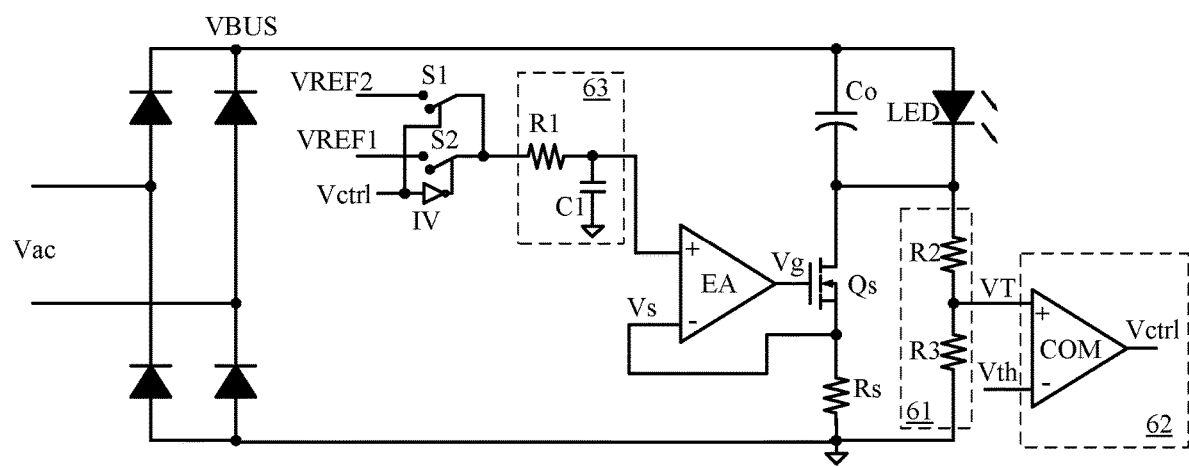
FIG. 6 is a schematic block diagram of a second example driving circuit for driving an LED load, in accordance with embodiments of the present invention.

Referring now to FIG. 6, shown is a schematic block diagram of a second example driving circuit for driving an LED load, in accordance with embodiments of the present invention. In this particular example, the number of the reference signals is two. The transistor current can include a first current (e.g., IREF1) with a relatively large value and a second current (e.g., IREF2) with a relatively small value. The difference between input voltage VBUS and driving voltage VLED may be represented by a comparison between the difference and a preset voltage threshold. If the difference between input voltage VBUS and driving voltage VLED is less than the voltage threshold, the real-time current flowing through power transistor Qs can be controlled to be current IREF1 with a relatively large value. If the difference between input voltage VBUS and driving voltage VLED is greater than the voltage threshold, the real-time current flowing through power transistor Qs can be controlled to be current IREF2 with a relatively small value.

For example, the driving circuit for driving an LED load can include detecting circuit 61 and comparing circuit 62. Detecting circuit 61 can acquire voltage detection signal VT representing the difference between input voltage VBUS and driving voltage VLED. For example, detecting circuit 61 may be configured as a resistor divider network including resistors R2 and R3, and detecting circuit 61 can be coupled in parallel to power transistor Qs. Comparing circuit 62 can compare the received voltage detection signal VT against voltage threshold Vth, and may generate comparison signal Vctrl based on the comparison result thereof, in order to determine the difference between input voltage VBUS and driving voltage VLED.

The selecting circuit can receive comparison signal Vctrl to control the switching between reference signal VREF1 corresponding to current IREF1, and reference signal VREF2 corresponding to current IREF2. For example, the selecting circuit can include switch S1, switch S2, and a logic circuit including inverter IV. A second terminal of switch 51 can connect to a second terminal of switch S2. A first terminal of switch 51 can receive reference signal VREF1, and a first terminal of switch S2 may receive reference signal VREF2. The switching states of switches 51 and S2 may be complementary to each other based on comparison signal Vctrl.

When voltage detection signal VT is greater than voltage threshold Vth (e.g., when the difference between input voltage VBUS and driving voltage VLED is large), switch 51 can be controlled to be turned on and switch S2 can be controlled to be turned off based on comparison signal Vctrl. Also, reference signal VREF2 with a small value may be selected as a reference signal to be transmitted to the drive signal generating circuit. When voltage detection signal VT is less than voltage threshold Vth (e.g., the difference between input voltage VBUS and driving voltage VLED is small), switch S2 can be controlled to be turned on and switch 51 is controlled to be turned off based on comparison signal Vctrl. Also, reference signal VREF1 with a large value may be selected as a reference signal to be transmitted to the drive signal generating circuit.

In this particular example, the detecting circuit can determine the difference between input voltage VBUS and driving voltage VLED by detecting the voltages across power transistor Qs. Other detecting circuits capable of realizing the above function may additionally or alternatively be utilized in certain embodiments. For example, the detecting circuit may determine the difference between input voltage VBUS and driving voltage VLED by detecting alternating current voltage Vac or input voltage VBUS.

The drive signal generating circuit can include amplifier EA. Amplifier EA may generate drive signal Vg based on a difference between the received reference signal and detection signal Vs, in order to drive the control terminal of power transistor Qs. A power terminal of power transistor Qs can be coupled to ground via detection resistor Rs, such that the real-time current flowing through power transistor Qs may be controlled to a current corresponding to the reference signal (e.g., one of currents IREF1 and IREF2). In this example, the time length used for the switching between currents IREF1 and IREF2 may be extended in order to improve EMC performance.

For example, the driving circuit can also include buffer circuit 63 arranged between the selecting circuit and the drive signal generating circuit, in order to extend a time length used for switching between the reference signals generated by the selecting circuit. The buffer circuit can include resistor R1 and capacitor C1 connected in series between the output terminal of the selecting circuit and ground. A voltage at a common node between resistor R1 and capacitor C1 may be transferred to the drive signal generating circuit.

When the reference signal is switched from reference signal VREF2 to reference signal VREF1, reference signal VREF1 can be filtered, and the reference signal may slowly be increased from reference signal VREF2 to reference signal VREF1 at an increasing slope, such that the transistor current can slowly be increased from current IREF2 to current IREF1. Similarly, when the reference signal is switched from reference signal VREF1 to reference signal VREF2, reference signal VREF2 can be filtered, and the reference signal may slowly be decreased from reference signal VREF1 to reference signal VREF2 at a decreasing slope, such that the transistor current may slowly be decreased from current IREF1 to current IREF2, thereby obtaining good EMC performance.

Figure 7:
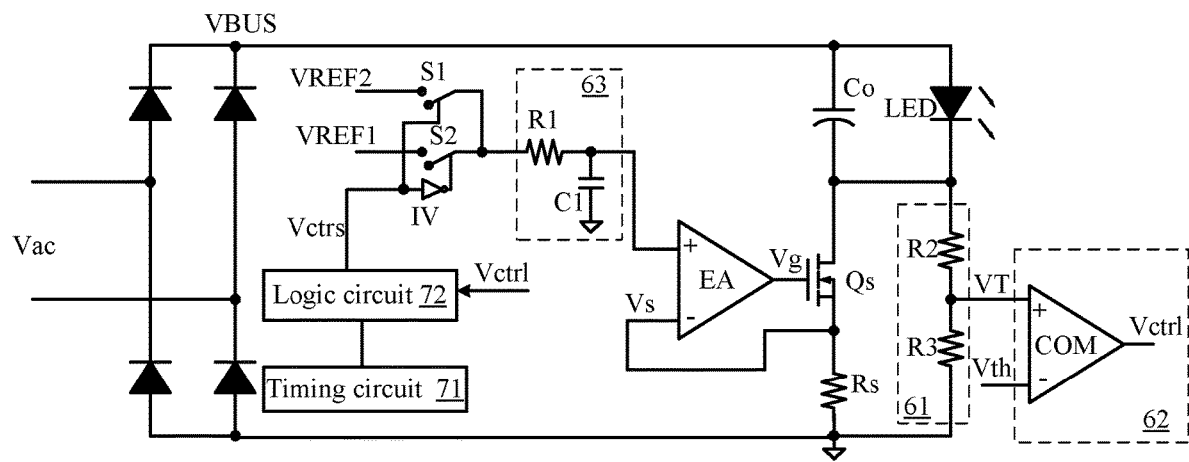
FIG. 7 is a schematic block diagram of a third example driving circuit for driving an LED load, in accordance with embodiments of the present invention.

Referring now to FIG. 7, shown is a schematic block diagram of a third example driving circuit for driving an LED load, in accordance with embodiments of the present invention. In this particular example, the number of the reference signals is two. The driving circuit for driving an LED load in this example also can include timing circuit 71, in order to limit the duration during which the transistor current is at current IREF1 with a large value. Timing circuit 71 can time the duration at current IREF1 based on the first time threshold, and may generate a first timing signal when the duration at current IREF1 reaches the first time threshold, in order to control the transistor current to switch from current IREF1 to current IREF2 with a small value. The driving circuit can also include logic circuit 72. Logic circuit 72 can generate control signal Vctrs based on comparison signal Vctrl and the first timing signal, in order to control switches S1 and S2, so as to achieve the switching between reference signals VREF1 and VREF2.

In some application scenarios, if a degree of decreasing in the input voltage is out of a preset range, or the LED driving system has a deep dimming depth in the case of having a dimming function, the voltage across the power transistor can be relative small, and the duration during which the voltage across the power transistor is lower than the voltage threshold may be relative long. A maximum time length of the duration during which the current flowing through the power transistor is at current IREF1 may be limited with the timing circuit, thus potentially avoiding an excessively high average current that may impact driving the LED load to emit a light having a desired brightness.

Further, if the time length of the duration at current IREF1 is limited to a time length represented by the first time threshold, the timing circuit may further limit a time length of the duration at current IREF2 based on the second time threshold. When the time length of the duration at current IREF2 reaches a time length represented by the second time threshold, the transistor current can switch to current IREF1 with a large value from current IREF2 (see, e.g., FIG. 4). Timing circuit 71 may be implemented in any suitable manner (e.g., via an analog circuit or a digital circuit). In this particular example, the timing circuit 71 may control the maximum time length of the duration at current IREF1 by limiting a length of a conduction time period of the switch S2, such that the duration during which the transistor current is current IREF1 is not excessively long. For example, a capacitor can be charged by a constant current source, and a duration during which a ramp voltage across the capacitor is increased to the first time threshold may be timed, in order to acquire the first timing signal. For example, this control may be achieved by logic circuit 72 including an OR-gate based on the first timing signal and comparison signal Vctrl.

Timing circuit 71 may control a maximum time length of the duration at current IREF2 by limiting a length of a conduction time period of the switch S1, such that the duration during which the transistor current is current IREF2 is not excessively long after the time length of the duration at current IREF1 is limited to the time length represented by the first time threshold. For example, a capacitor can be charged by a constant current source, and a duration during which a ramp voltage across the capacitor is increased to the second time threshold may be timed, in order to acquire the second timing signal. For example, this control may be achieved by logic circuit 72 including an OR-gate based on the second timing signal and the comparison signal Vctrl.

It should be understood that power transistor Qs may be implemented by a metal-oxide-semiconductor field-effect transistor (MOSFET) transistor, or other suitable types of controllable transistor. Rather than a closed-loop feedback control method, the constant current control for the LED load can be achieved in an open-loop control mode in certain embodiments. In the open-loop control mode, the voltage threshold and a ratio between the reference signals may be set based on the variation range of the input voltage and/or the variation range of the driving voltage, without calculating the error between the current average current of the LED load and the desired current, such that the average current meets the requirement of driving the LED load to emit a light having a desired brightness.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of driving a light-emitting diode (LED) load, the method comprising:

a) controlling a power transistor coupled in series with the LED load to operate in a linear mode when an input voltage varying periodically is higher than a driving voltage for the LED load;
   b) adjusting a transistor current flowing through the power transistor based on a difference between the input voltage and the driving voltage, without calculating an error between an average current flowing through the LED load and a desired current;
   c) wherein the transistor current is controlled to be decreased when the difference between the input voltage and the driving voltage is relatively large, in order to reduce a conduction loss of the power transistor, and to cause the average current flowing through the LED load to meet a predetermined requirement of driving the LED load; and
   d) wherein the transistor current in a first time period is controlled to be less than the transistor current in a second time period when the difference between the input voltage and the driving voltage in the first time period is greater than the difference between the input voltage and the driving voltage in the second time period.

2. The method of claim 1, wherein:
   a) a voltage threshold corresponding to the difference between the input voltage and the driving voltage is predetermined; and
   b) the transistor current in a time period in which the difference between the input voltage and the driving voltage is greater than the voltage threshold is controlled to be less than the transistor current in a time period in which the difference between the input voltage and the driving voltage is less than the voltage threshold.

3. The method of claim 2, wherein:
   a) reference currents according to the predetermined requirement are set; and
   b) the transistor current is controlled to switch between the reference currents based on a comparison between the voltage threshold and the difference between the input voltage and the driving voltage.

4. The method of claim 2, wherein the transistor current is controlled to vary from one value to another value in a stepwise manner during a half cycle in which the input voltage is in a rising phase.

5. The method of claim 4, wherein the transistor current is controlled to be symmetrical with the transistor current during the half cycle in which the input voltage is in the rising phase during a half cycle in which the input voltage is in a falling phase.

6. The method of claim 1, wherein a time length that the transistor current switches from one value to another value is extended to improve an electromagnetic compatibility (EMC) performance.

7. The method of claim 6, wherein the transistor current is controlled to vary from the one value to the another value in a ramp manner.

8. The method of claim 1, wherein when a duration during which the transistor current is maintained at a first current reaches a first time threshold, the transistor current is controlled to switch to a second current, wherein the first current is greater than the second current.

9. The method of claim 8, wherein:
   a) after the transistor current switches to the second current, a duration during which the transistor current is maintained at the second current is detected; and b) when the duration during which the transistor current is maintained at the second current reaches a second time threshold, the transistor current is controlled to switch to the first current.

10. The method of claim 1, wherein:
a) in the time period in which the input voltage is higher than the driving voltage, the transistor current is controlled to switch between a first current and a second current, wherein the first current is greater than the second current; and
b) based on a comparison between a voltage threshold and the difference between the input voltage and the driving voltage, durations of the first current and the second current are adjusted, such that the average current meets a requirement of driving the LED load when the input voltage varies.

11. The method of claim 10, wherein:
a) in a cycle, when the input voltage is higher than the driving voltage, and when the difference between the input voltage and the driving voltage is less than the voltage threshold, the transistor current is controlled to be the first current; and
b) when the difference between the input voltage and the driving voltage is greater than the voltage threshold, the transistor current is controlled to be the second current.

12. The method of claim 10, wherein based on the input voltage and the driving voltage, the voltage threshold and a ratio of the first current to the second current are set, such that an error of the average current caused by variations of the durations of the first and second currents is in a predetermined range.

13. A driving circuit for a light-emitting diode (LED) load, the driving circuit comprising:
a) a power transistor coupled in series with the LED load, and being configured to receive an input voltage that varies periodically;
b) a control circuit configured to, when the input voltage is higher than a driving voltage for the LED load, control the power transistor to operate in a linear mode, and to control a transistor current flowing through the power transistor based on a difference between the input voltage and the driving voltage, without calculating an error between an average current flowing through the LED load and a desired current;
c) the control circuit being configured to, when the difference between the input voltage and the driving voltage is relatively large, control the transistor current to be decreased, to reduce a conduction loss of the power transistor, and cause the average current flowing through the LED load to meet a predetermined requirement of driving the LED load; and
d) a drive signal generating circuit configured to generate a drive signal based on the difference between the input voltage and the driving voltage, in order to control the transistor current in a first time period to be less than the transistor current in a second time period when the difference between the input voltage and the driving voltage in the first time period is greater than the difference between the input voltage and the driving voltage in the second time period.

14. The driving circuit of claim 13, wherein the control circuit comprises a selecting circuit configured to select one of reference signals representing expected values of the transistor current based on the difference between the input voltage and the driving voltage, and to provide the selected reference signal to the drive signal generating circuit.

15. The driving circuit of claim 14, further comprising:
a) a first detecting circuit coupled in series with the power transistor, and being configured to detect an instantaneous current flowing through the power transistor and to generate a current detection signal based on the detected instantaneous current; and
b) the drive signal generating circuit being configured to generate the drive signal based on the current detection signal and the selected reference signal, in order to drive a control terminal of the power transistor, such that the transistor current coincides with the selected reference signal.

16. The driving circuit of claim 14, wherein the selecting circuit comprises:
a) a plurality of switches arranged in one-to-one correspondence with the reference signals; and
b) a logic circuit configured to generate control signals for controlling switching states of the plurality of switches based on the difference between the input voltage and the driving voltage.

17. The driving circuit of claim 14, further comprising a buffer circuit coupled between the selecting circuit and the driving signal generating circuit, and being configured to extend a time length used for switching between the reference signals.

18. The driving circuit of claim 17, wherein the buffer circuit comprises a filter circuit configured to filter a voltage signal representing the selected reference signal, such that the transistor current is controlled to vary from the one value to the another value in a ramp manner.

* * * * *